(12) United States Patent
Socolovsky et al.

(10) Patent No.: US 10,450,239 B2
(45) Date of Patent: Oct. 22, 2019

(54) SPHERICAL FERTILIZERS AND PROCESS FOR THE PRODUCTION THEREOF

(71) Applicant: Dead Sea Works Ltd., Beer Sheva (IL)

(72) Inventors: Ruben Socolovsky, Beersheba (IL); Ofir Cohen, Arad (IL); Natalia Geinik, Arad (IL); Khalil Abu-Rabeah, Beer Sheva (IL)

( * ) Notice: Subject to any disclaimer, the term of this patent is extended or adjusted under 35 U.S.C. 154(b) by 0 days.

(21) Appl. No.: 15/559,424

(22) PCT Filed: Mar. 22, 2017

(86) PCT No.: PCT/IL2017/050358
§ 371 (c)(1),
(2) Date: Sep. 19, 2017

(87) PCT Pub. No.: WO2017/163246
PCT Pub. Date: Sep. 28, 2017

(65) Prior Publication Data
US 2018/0179117 A1     Jun. 28, 2018

Related U.S. Application Data

(60) Provisional application No. 62/311,699, filed on Mar. 22, 2016.

(51) Int. Cl.
*B01J 2/00* (2006.01)
*C05G 3/00* (2006.01)
(Continued)

(52) U.S. Cl.
CPC .............. *C05G 3/0052* (2013.01); *B01J 2/00* (2013.01); *B01J 2/22* (2013.01); *C05B 1/02* (2013.01); *C05B 1/04* (2013.01); *C05B 7/00* (2013.01); *C05C 1/00* (2013.01); *C05C 1/02* (2013.01); *C05C 3/005* (2013.01); *C05C 5/02* (2013.01);
(Continued)

(58) Field of Classification Search
None
See application file for complete search history.

(56) References Cited

U.S. PATENT DOCUMENTS 3,332,470 A    7/1967   Chirico
3,532,621 A   10/1970   Hough
(Continued)

FOREIGN PATENT DOCUMENTS

CN    1091990 A    9/1994
CN    1387497     12/2002
(Continued)

OTHER PUBLICATIONS

R. L. Earle., "Chapter 8: Evaporation. Multiple Effect Evaporation", Unit Operations in Food Processing, (Dec. 31, 1983), URL: http://www.nzifst.org.nz/unitoperations/evaporation2.htm, XP055282974.
(Continued)

*Primary Examiner* — Wayne A Langel
(74) *Attorney, Agent, or Firm* — Graeser Associates International Inc; Dvorah Graeser

(57) ABSTRACT

According to some demonstrative embodiments, there is provided herein a spherical fertilizer granule having a specific gravity of more than 1.94 g/cm² and less than 3% porosity.

14 Claims, 4 Drawing Sheets

(51) Int. Cl.

| | |
|---|---|
| *C05D 9/00* | (2006.01) |
| *C05F 11/00* | (2006.01) |
| *C05D 9/02* | (2006.01) |
| *C05D 1/02* | (2006.01) |
| *C05C 1/00* | (2006.01) |
| *C05C 9/00* | (2006.01) |
| *C05D 1/00* | (2006.01) |
| *C05F 3/00* | (2006.01) |
| *C05B 7/00* | (2006.01) |
| *C05F 1/00* | (2006.01) |
| *C05C 11/00* | (2006.01) |
| *C05B 1/02* | (2006.01) |
| *B01J 2/22* | (2006.01) |
| *C05C 5/02* | (2006.01) |
| *C05B 1/04* | (2006.01) |
| *C05C 1/02* | (2006.01) |
| *C05C 3/00* | (2006.01) |
| *C05D 3/02* | (2006.01) |

(52) U.S. Cl.
CPC ............... *C05C 9/00* (2013.01); *C05C 9/005* (2013.01); *C05C 11/00* (2013.01); *C05D 1/00* (2013.01); *C05D 1/005* (2013.01); *C05D 1/02* (2013.01); *C05D 3/02* (2013.01); *C05D 9/00* (2013.01); *C05D 9/02* (2013.01); *C05F 1/00* (2013.01); *C05F 3/00* (2013.01); *C05F 11/00* (2013.01); *C05G 3/00* (2013.01); *C05G 3/0011* (2013.01); *C05G 3/0029* (2013.01); *C05G 3/0035* (2013.01); *C05G 3/0041* (2013.01); *C05G 3/0058* (2013.01)

(56) References Cited

U.S. PATENT DOCUMENTS

| | | | | | |
|---|---|---|---|---|---|
| 3,548,046 | A | * | 12/1970 | Savage | ...................... B01J 2/00 264/118 |
| 3,711,254 | A | * | 1/1973 | McGowan | ................. B01J 2/14 209/17 |
| 3,876,387 | A | | 4/1975 | Coulson | |
| 4,963,231 | A | | 10/1990 | Ryham | |
| 5,112,379 | A | * | 5/1992 | Young | ...................... C05D 9/00 71/31 |
| 5,651,888 | A | | 7/1997 | Shimizu | |
| 6,287,496 | B1 | * | 9/2001 | Lownds | ................. C05F 11/02 264/118 |
| 2002/0121117 | A1 | * | 9/2002 | Hartmann | ................. C05C 7/00 71/55 |
| 2004/0139992 | A1 | | 7/2004 | Murkute | |
| 2005/0072724 | A1 | | 4/2005 | Nakayama | |
| 2005/0276905 | A1 | * | 12/2005 | Xing | ........................ B01J 2/006 427/2.1 |
| 2006/0144789 | A1 | | 7/2006 | Cath | |
| 2009/0272692 | A1 | | 11/2009 | Kurth | |
| 2010/0213129 | A1 | | 8/2010 | Jones | |
| 2011/0017666 | A1 | | 1/2011 | Cath | |
| 2011/0064853 | A1 | | 3/2011 | Maeki | |
| 2011/0123420 | A1 | | 5/2011 | Phinney | |
| 2013/0001162 | A1 | | 1/2013 | Yangali-Quintanilla | |
| 2013/0264260 | A1 | | 10/2013 | Heinzl | |
| 2014/0001122 | A1 | | 1/2014 | Schultz | |
| 2014/0175011 | A1 | | 6/2014 | Benton | |
| 2014/0245803 | A1 | * | 9/2014 | Forsythe | .............. C05G 3/0058 71/61 |
| 2015/0014232 | A1 | | 1/2015 | McGinnis | |
| 2015/0101987 | A1 | | 4/2015 | Yeh | |

FOREIGN PATENT DOCUMENTS

| | | |
|---|---|---|
| CN | 1485124 | 3/2004 |
| GB | 2522490 | 7/2015 |
| KR | 101335445 B1 | 12/2013 |
| SU | 695018 A1 | 6/1982 |
| SU | 1574542 A1 | 6/1990 |
| WO | 2009086587 | 7/2009 |
| WO | 2009086587 A1 | 7/2009 |
| WO | 2011053794 A2 | 5/2011 |
| WO | 2012109723 A1 | 8/2012 |

OTHER PUBLICATIONS

RU Office Action dated May 15, 2017 for RU Application No. 2015103308 (9 pages).
RU Search Report dated May 5, 2017 for RU Application No. 2015103308 (2 pages).
International Search Report and Written Opinion dated Dec. 19, 2013 for corresponding International Patent Application No. PCT/US2013/049166.
Unit Operations in Food Processing—R. L Earle, 1983, NZIFST, http://www.nzifst.org.nz/unitoperations/evaporation2.htm.
Written Opinion of the International Search Authority for parent PCT application PCT/IL2014/050278, dated Sep. 14, 2015.
Written Opinion of the International Searching Authority for related PCT/IL2017/050358 dated Jun. 28, 2017.

* cited by examiner

4A

4B

SPHERICAL FERTILIZERS AND PROCESS FOR THE PRODUCTION THEREOF

FIELD OF THE INVENTION

The present invention relates to fertilizers derived from any material of natural or synthetic origin that is applied to soils or to plant tissues to supply one or more plant nutrients essential to the growth of plants, specifically to fertilizers having a shape of a sphere.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:
Nitrogen (N): leaf growth;
Phosphorus (P): Development of roots, flowers, seeds, fruit;
Potassium (K): Strong stem growth, movement of water in plants, promotion of flowering and fruiting;
three secondary macronutrients: calcium (Ca), magnesium (Mg), and sulphur (S);
micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer that is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

Nutrients are released out of coated fertilizer prills through osmosis at a rate that is positively correlated with increased temperature. The release rates are associated with the type and/or thickness of the coating on the fertilizer prill granule.

CRF fertilizers are available with different longevities. Most manufacturers have products with 3, 6, 9, or 12-month release periods. Products with different longevities are manufactured by blending fertilizer prills of different coating thicknesses: the thinner coated prills release nutrients first and then the thicker-coated prills release nutrients later. Short-term crops such as annuals would probably require 3-month release products and longer-term crops such as woody perennials would require fertilizer products with a 12-month release period.

U.S. Pat. No. 2,935,387 teaches a compacting process for producing a granular product.

U.S. Pat. No. 3,026,194 discloses a method of improving muriate of potash particles previously compacted and dried from fines comprising wetting said particles with a useful amount of an aqueous solution, and drying the particles, whereby the physical competency of the particles is improved.

U.S. Pat. No. 3,048,478 relates to a method for producing a granular, chemical salt of superior storage qualities, and more particularly to a method which include a step of sintering a narrow size range of particles of a granular inorganic salt to produce densified particles which are less frangible and have better storage and handling qualities.

GB 1079673 teaches improvements in or relating to agglomeration of potash containing material, wherein finely divided granular potash containing salt ore, e.g. <48 mesh, is agglomerated, e.g. for fertilizer application, by wetting the fines with an aqueous solution containing hydrofluoric acid or a metal fluoride, forming the wetted particles into aggregates, e.g. in a pelletizing drum or on a pelletizing disc or balling drum, and hardening the aggregates by drying at an elevated temperature below the fusion temperature, e.g. 200° to 650° C. The hydrofluoric acid or metal fluoride solution may be applied prior to, during or subsequent to pelletizing and the preferred solution contains about 10 percent by weight of the fluoride compound which is used in a ratio by weight to the granular material of about 2:100. The pellets are preferably agitated during the drying process.

GB1073682 teaches a process for compacting muriate of potash, wherein a mixture of potassium chloride and up to 10 percent of an additive consisting of urea, ammonium nitrate or a mixture of ammonium nitrate and phosphate having a m.p. below 400° F. is compacted at a pressure of 200-10,000 pounds per linear inch per bearing by the use of a single or double roll compactor and the resulting sheet material is comminuted. The additive may be mixed dry or a concentrated solution or suspension. Compaction may be at 20-80° C.

U.S. Pat. No. 3,513,230 teaches a process for improving the resistance to physical breakdown of potassium sulfate compacts formed by compacting particulate potassium sulfate feed material under pressure. The resistance to physical breakdown of such compacts is improved by controlling the moisture content of the feed material during compaction to between about 0.5% and 2.0% by weight and compacting the feed material at a pressure within the range of between about 12,000 and 40,000 p.s.i. The resistance of such compacts to physical breakdown is further improved by compacting the feed material at a temperature of approximately 90° C. The potassium sulfate compacts may be subjected to granulation to provide a quantity of granules having improved resistance to physical breakdown. The resistance of such granules to physical breakdown may be further improved by moistening the granules with water and thereafter evaporating the Water from the moistened granules.

U.S. Pat. No. 3,532,486 relates to an improved method for compacting and subsequently granulating liquid hydrocarbon-containing water-soluble solid particle fines by admixing with such contaminated fines a small amount of liquid hydrocarbon free pure water-soluble fines of the same material and thereafter compacting and granulating the fine mixture.

CA988315 discusses compaction of potash

U.S. Pat. No. 6,379,414 teaches A process is for the production of potash fertilizer granulates which have a stable shelf life also at high relative air humidities. This granulate contains an additive in the form of magnesium oxide and/or calcium oxide in a fine powder form, which is added by metering in prior to the compacting step. The result is a high final bursting strength even if the granulate is stored in a wet climate.

US2010040882 discloses a method for forming a potassium chloride particle from potassium chloride powder having resistance to moisture absorption and shrinkage. The original feedstock comprises potassium chloride in a size distribution of 30 mesh and 100 mesh as well as a gluten based binder.

US 20130031943 discloses a granular cohered MOP fertilizer having one or more micronutrients, and one or more binding ingredients. The fertilizer is prepared by compacting MOP feed material with one or more micronutrients and one or more optional binders to form a cohered MOP composition. The cohered MOP composition is then further processed, such as by crushing and sizing, to form a cohered granular MOP product containing micronutrients.

It is preferable than no more than 20% of the particles of the powder will have a particle size of less than 150 μm (also referred to herein as "fertilizer dust" or "dust") because having more than 20% of the particles of the powder with a particle size of less than 150 μm will cause the bulk density of the overall mass of the powder to be too low for an efficient process, causing, for example, to the shaking of the machine, the final product having increased porosity, high occurrence of process shutdown and the like.

SUMMARY OF THE INVENTION

According to some demonstrative embodiments disclosed herein, there is provided a process for the production of spherical fertilizers, wherein the process includes one step compaction.

According to some embodiments, the spherical fertilizer may dissolve at a slower rate than non-spherical fertilizers.

According to some demonstrative embodiments, the process may include compacting a fertilizer dust, fine, standar or a combination of them, using varying compactor pressure and via a "one step" compaction.

According to some embodiments, the varying pressure may provide for a superior control over various characteristics of the final fertilizer product, such as, porosity, s.g specific gravity.

According to some embodiments, control over the various characteristics may provide for a variety of features such as sustained release profile of the final product and the like.

According to some embodiments, the compacted fertilizer may be coated with one or more coatings.

According to some demonstrative embodiments, after the fertilizer is compacted post-treatment may be implemented, e.g., to improve the surface of the fertilizer granules and prepare it for coating.

According to some demonstrative embodiments, the fertilizer granule may include a particle size distribution (PSD) of between 0.5-10 mm, preferably between 2 to 6 mm and a Uniform Index (UI) between 70 to 100 for one determined PSD of the product, 40 to 100 for combined products.

According to some embodiments, a combination of several granule diameters can be mixed to get the exactly required PSD and UI.

BRIEF DESCRIPTION OF THE DRAWINGS

The present invention will become fully understood from the detailed description given herein below and the accompanying drawings, which are given by way of illustration and example only, and thus not limiting in any way, wherein.

DETAILED DESCRIPTION OF THE INVENTION

Figure 1:
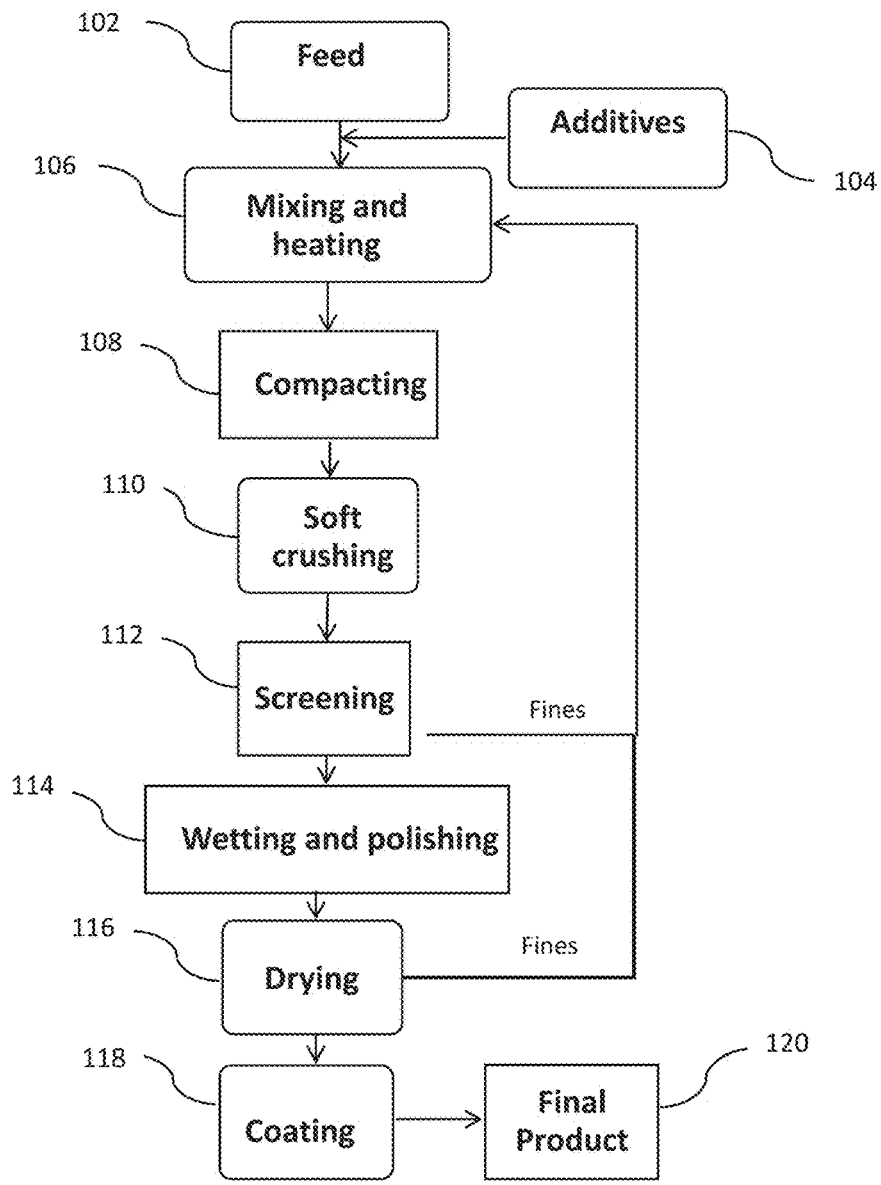
FIG. 1 demonstrates a flow chart depicting the process of compaction and production of the spherical fertilizer in accordance with some demonstrative embodiments.

According to some demonstrative embodiments disclosed herein, there is provided a process for the production of spherical fertilizers, wherein the process includes one step compaction.

According to some demonstrative embodiments, the term "fertilizer" may include any material of natural or synthetic origin that is applied to soils or to plant tissues to supply one or more plant nutrients essential to the growth of plants, including, for example, Single nutrient ("straight") fertilizers such as Ammonium nitrate, Urea, calcium ammonium nitrate, superphosphate, e.g., "Single superphosphate" (SSP), phosphogypsum, Triple superphosphate (TSP) or a mixture thereof; Multinutrient fertilizers such as Binary (NP, NKJ PK) fertilizers, e.g., monoammonium phosphate (MAP) and/or diammonium phosphate (DAP), NPK fertilizers which are three-component fertilizers providing nitrogen, phosphorus, and potassium; fertilizers which include one or more of the main micronutrients sources of iron, manganese, boron, molybdenum, zinc, and copper and the like; Compound fertilizers, e.g., which contain N, P, and K; Organic fertilizers such as peat, animal wastes, plant wastes from agriculture, and sewage sludge; and/or Other elements such as calcium, magnesium, and sulfur.

According to some embodiments, the fertilizer preferably includes one or more of nitrogen fertilizers such as ammonia, anhydrous ammonium nitrate, urea and sodium nitrate; Phosphate fertilizers; Potassium fertilizers, such as Potash, potassium chloride, potassium sulfate, potassium carbonate, or potassium nitrate According to some embodiments, the fertilizer is preferably Potash, Sulfates such as, SOP, Poly-sulfates: and in some embodiments may include Micronutrients such as Zn, B, Cu, Fe, Mo in a concentrations between 0.1-2%.

According to some embodiments, the fertilizer may include 48% $SO_3$ as sulphate, 14% $K_2O$ as from sulphate of potash, 6% MgO as from magnesium sulphate and 17% CaO as from calcium sulphate (also known as Polysulphate™).

According to some embodiments the fertilizer may be colored with inorganic or organic pigments, for example, ferric oxide or polymeric colorants.

According to some embodiments, the spherical fertilizer may have superior characteristics and/or one or more benefits in comparison to non-spherical fertilizers, e.g., fertilizer which have been compacted but not in a spherical shape. For example, the spherical fertilizer may dissolve at a slower rate than non-spherical fertilizers, and see for example table 1 below which demonstrates a comparison between the percentage of release of $K_2O$ from spherical Potash Vs. Non-spherical (Compacted) Potash.

TABLE 1

| Time Days | Release % (K₂O) | |
| --- | --- | --- |
| | Spherical potash | Compacted potash |
| 0 | 0 | 3 |
| 5 | 3 | 18 |
| 10 | 5 | 22 |
| 15 | 8 | 27 |

As shown in table 1, the percentage of release of IGO from Non-spherical (Compacted) Potash can be between 3-6 times higher in comparison to the percentage of release of IGO from spherical Potash.

According to some embodiments, the fact that the spherical fertilizer is released at a slower percentage and/or rate enables to lessen the frequency of administration to the plant. This feature is of high commercial value as it provides for a fertilizer which may be applied less frequently with diminished or with no effect on the nutrient absorption by the plant.

According to some demonstrative embodiments, producing the fertilizer in a spherical shape provides various benefits including for example, diminished dust production during transport of the fertilizer, reduce the caking effect and consequentially the environmental dust which is often produced as a side effect. The spherical fertilizer also enables the preservation of high quality of the fertilizer by maintaining the original PSD of the product as produced. In addition, according to some demonstrative embodiments, producing the fertilizer in a spherical shape allows to yield an optimal homogeneity of the fertilizer product and may enable the control over possible segregation of the product particles.

According to some demonstrative embodiments, the spherical fertilizer is characterized with having relatively high specific gravity (s.g.) and high homogenous quality.

According to some demonstrative embodiments, the process of the present invention allows for the control over the PSD of the spherical fertilizer. According to some embodiments, if a protective coating agent is applied onto the fertilizer, it may be used in relatively small quantities and can easily and efficiently be distributed of the fertilizer in a homogeneous manner. According to these embodiments, using less of the protective agent in comparison to known methods of producing fertilizer granules enables for the reduction of costs and materials via the process of the present invention. According to some demonstrative embodiments, the process of the present invention uses fertilizer dust having at least 20% of the particles with a size of less than 150 μm to create spherical fertilizer granules. According to some embodiments, the spherical shape may prevent the formation of broken particles during the production process and as such, in contrast to other production processes known today, the final product of the present invention does not need to be screened in the port before packaging and shipment. Unlike current products known in the field which require treatment before shipment and packaging, the product of the present invention therefore obviates the need for further treatment before shipment, and thus saves time and money.

In addition, adding anti-dust agent which are intended to prevent the formation of dust is redundant and thus making the process cost-effective. According to some embodiments, the process of the present invention reduces to minimum the production of fine particles, which usually result from the formation of dust and from cracking of the product. Production processes known in the art re-use such fine particles via reincorporation into the compaction process. An important benefit of the present invention lies in the fact that the process reduces to minimum the creation of such fine particles, thereby providing for a very high yield of the final product (over 95%) and obviating the need to re-use the fine particles, thereby saving time and money.

According to some demonstrative embodiments, the term "sphere" and/or "spherical" and/or "pseudo-spherical" as used herein may refer, for example, to any round geometrical object in three-dimensional space, e.g., having the shape of a round or elliptic ball.

Usually, compaction of dust is a challenging process which involves repeated use of dust leftovers and dust residue which is reincorporated back into the compaction process in order to increase the final yield. Also, the final product after the compaction process which is completed need to be physically broken down to yield the final fertilizer granules. This is because using ordinary compaction methods yield a sheet of fertilizer granules adhered to one another, which need to be broken down to separate granules. Beyond the complexity in handling such a step, the ordinary compaction process also yields a product which might have bumps and dents, which affect the rate of release of the fertilizer and cause variance in the release profile.

According to some demonstrative embodiments described herein, the process of the present invention includes only a single step of compaction (also referred to herein as a "one step" compaction), at the end of which the final compacted spherical fertilizer is yielded, using for example, varying pressure exerted at the compaction step.

According to some embodiments of the present invention, the process of the present invention, as described in detail below, includes the use of compaction rolls having spherical shaped cavities which are closely located thereby enabling isolated production of the granules of the fertilizer and diminishing to a minimum the production of redundant or unusable material during the process.

Unlike common compaction methods which usually result in over 60% of unusable material (such as fine particles, broken particles and the like) which need to be incorporated back into the process (also known as "recycled"), the process of the present invention provides for the accurate, high yield production of spherical fertilizers with high s.g. with a yield of over 95% in a single step.

According to some demonstrative embodiments, the term "varying pressure" may relate to any specific force in the range of 3-30 kN/cm·mm.

According to some embodiments, the varying pressure may provide for a superior control over various characteristics of the final fertilizer product, such as, porosity, specific gravity ("s.g.") and the like.

According to some embodiments, applying varying pressure on the fertilizer dust may provide control over one or more of the following: the porosity of the final spherical granule, water penetration into the granules, dissolution rate and/or the shelf life, for example, applying high pressure on the fertilizer dust during compaction may reduce water penetration into the granules and decrease the porosity of the granule, thereby providing for a stable and expected dissolution rate, for example, a preferred 80% dissolution over a period of at least 4 months.

According to some embodiments, applying varying pressure on the fertilizer dust may increase the s.g. and accordingly improve the resistance of the fertilizer against deterioration and/or moisture absorption and may improve the strength of the granule and may also prevent dust formation.

According to some embodiments, applying varying pressure on the fertilizer dust may yield a spherical fertilizer having a smooth surface. According to some embodiments, the smooth surface of the fertilizer granule may protect the granule against abrasion, humidity and/or breakings.

Current compaction methods used today provide for the production of a sheet of granules that needs to be broken down by applying force on the sheet (usually via a crusher). Such break down results in granules having sharp edges, rough surfaces having bumps and curves, a non-uniform particles size and more.

The process of the present invention, provides for the production of uniform spherical fertilizer granules having undergone soft crushing to provide more than 95% spherical granules which have a smooth surface, homogeneous and uniform size and do not require substantial screening.

According to some embodiments, applying varying pressure on the fertilizer dust may yield a spherical fertilizer. According to some embodiments, the spherical shape may improve the resistance of the granule against deterioration and may improve the strength of the granule and prevent dust formation.

According to some embodiments, the process may include the use of one or more binders. According to some embodiments, the use of binders may accelerate the velocity of compactor rolls, and consequently affect the rate of production and the quality of the final product and also enable the modification of the release velocity.

According to some demonstrative embodiments, the one or more binders may include any suitable material or compound that may mechanically and/or chemically hold or draw other materials together to form a cohesive whole including, for example, organic or inorganic binders, such as, starch, bentonite, sodium silicate, lignosulfonates, molasses, hydrated lime, bitumen, Portland cement, clay, acids (nitric, hydrochloric, phosphoric, sulphuric), cellulose gum, sucrose, water, water glass, cements, or combinations thereof.

According to some embodiments, control over the various characteristics of the process may provide for a variety of features characterizing the final product, such as a unique sustained release profile.

According to some demonstrative embodiments, the process of the present invention may enable the production of spherical fertilizer granules in various shapes to yield a final product with particles of different sizes.

According to some embodiments, having various particle sizes may enable to have a final fertilizer product with modified properties, for example, having some fast acting particles which have quicker dissolution rate due to their small size mixed with bigger particles which will dissolve more slowly. According to some embodiments, the process of the present invention may include using a compactor having two or more compactor rolls having a to surface including a plurality of semi-spherical concaved holes, which may be aligned to create spherical shapes upon compaction of a material.

As explained in detail below, the holes may be in various sizes and/or dimensions to provide for the production of spherical fertilizers in various sizes.

According to some embodiments, different PSD values of the spherical fertilizer granules of the present invention may affect the release time, for example, small particles (low PSD value) will dissolve faster than larger particles having a larger PSD.

According to some demonstrative embodiments of the present invention, there is provided a compacted fertilizer having a spherical or pseudo-spherical shape.

According to some embodiments, the compacted fertilizer may be coated with one or more coatings selected from the group including: Waxes, oils, stearic acid, citric acid, silica compound, polymers, anilines, ammonium sulfate, inorganic brine, petroleum compounds, amines, basic solutions, water, cements, dissolved salts, melted materials, hydrophobic compounds or a combination thereof.

According to some demonstrative embodiments, after the fertilizer is compacted post-treatment may be implemented, e.g., to improve the surface of the fertilizer granules and prepare it for coating.

According to some demonstrative embodiments, the post treatment may include rinsing or exposing the compacted fertilizer to one or more of water, aqueous solutions (organic and inorganic based), for example: water, brine, acid and basic solutions, organic solutions, amines, organic salts, amines, waxes, oils, lignosulfonates, polymers, for example, in order to change the release rate of the fertilizer from the final product and/or prevent the caking or dust formation.

According to some demonstrative embodiments, the spherical fertilizer granule may include a particle size distribution (PSD) of between 0.5-10 mm, preferably between 2 to 6 mm and a Uniform Index (UI) between 40 to 100.

According to some embodiments, a combination of several granule diameters can be mixed to get the exactly required PSD and UI, for example, having 20% of the particles with a PSD of 2 mm, 60% of the particles having a PSD of 4 mm and another 20% of the particles with a PSD of 6 mm.

According to some embodiments, the term "compactor" as used herein may refer to Self-Contained Compactors, Stationary Compactors, Precrusher Compactors, Transfer Station Compactors, Industrial Compactors, Electromechanical Compactors, Commercial Compactors, vertical and/or horizontal compactors, compactors with force feeder, compactors with gravitational feeder, compactors with horizontal feeders and the like.

Reference is made to FIG. 1 demonstrates a flow chart depicting the process of compaction and production of the spherical fertilizer in accordance with some demonstrative embodiments.

In this figure, feed 102 is optionally mixed with additives 104. According to some embodiments, feed 102 may include fine particle of a fertilizer, having a unified PSD between from 1 to 2000 or alternatively having a combination of particle sizes (various PSD) ranging from 1 to 2000.

According to some embodiments, additives 104 may include any suitable material that may facilitate the compaction of the fertilizer and/or enhance one or more characteristics of the fertilizer, such as, extend the shelf life, protect against moisture and/or oxidation, include micronutrients and/or macronutrients and the like. For example, additives 104 may include a binder in a concentration between 0.1 to 20% w/w.

According to some embodiments the mixture of feed 102, optionally with additives 104, may optionally be mixed homogenously with or without heating to 20 to 200 degrees Celsius, at step 106 to provide a homogeneous mixture.

According to some embodiments, the mixture may be mixed using any suitable mixer, selected for example from a group including: drums, high share mixer, paddle mixer, plow share, high velocity (pin mixer) and the like.

According to some embodiments of the present invention, the homogeneous mixture is fed into a compactor and compacted at step 108, According to other embodiments of the present invention, feed 102, optionally with additives 104, may be fed directly into a compactor and compacted at step 108, for example via force feeder, screw feeder or by gravitation, without passing through step 106.

Figure 2:
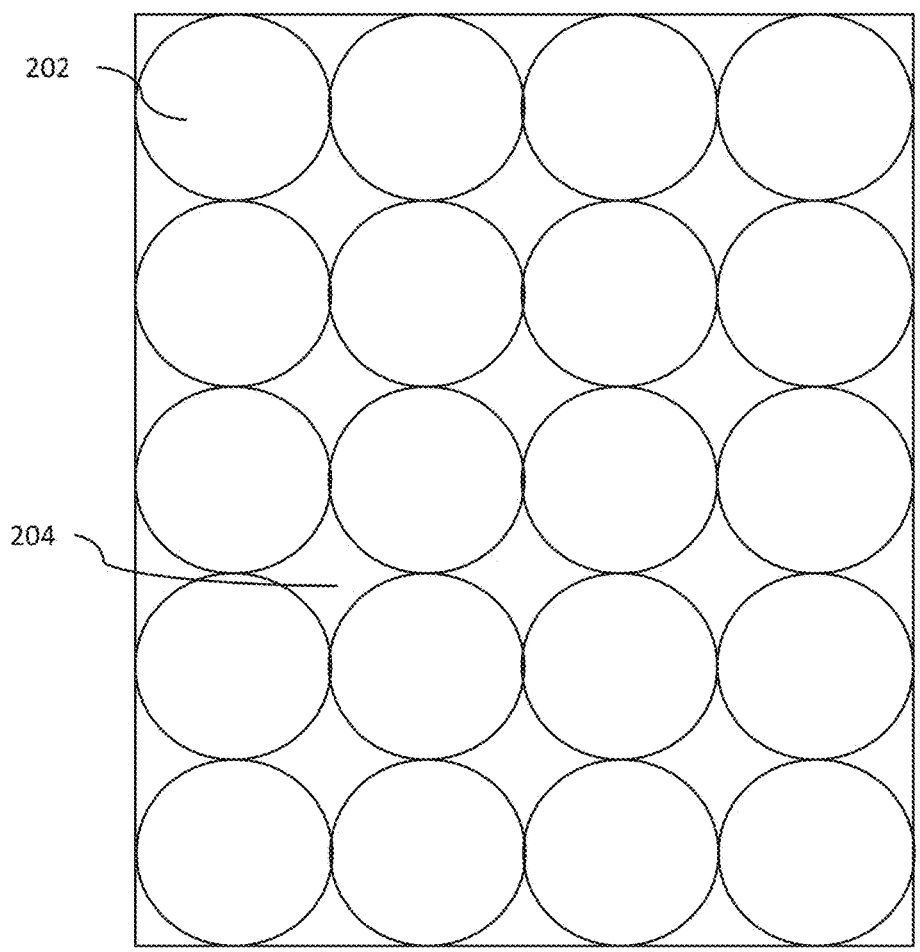
FIG. 2 is a schematic illustration of an exemplary surface of a compactor roll in accordance with some demonstrative embodiments of the present invention.
Figure 3:
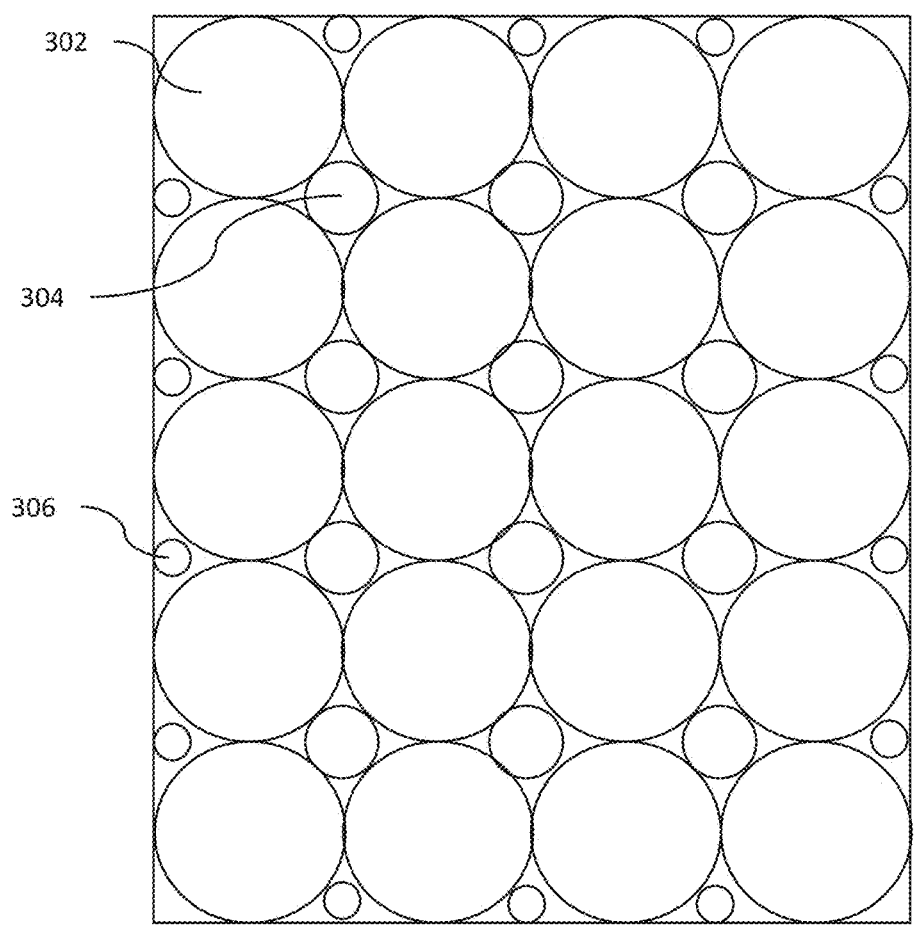
FIG. 3 is a schematic illustration of an exemplary surface of a compactor roll in accordance with some demonstrative embodiments of the present invention.

According to some embodiments, the compactor rolls at step 108 may include predetermined concaved regions on the surface of each rolls that may be synchronized upon compaction to form the shape of a sphere, for example, as depicted in FIGS. 2 and 3.

According to some embodiments, the gap between the rolls of the compactor may be predetermined before compaction begins, for example, the gap may be set between 0 to 5 mm.

According to some embodiments, the velocity of the rolls at step 108 may be changed according to the desired balls quality, for example, 0.1 m/s-10 m/s.

According to some embodiments, step 108 may include applying pressure to the compacted material, wherein the pressure may be controlled and varied. For example, the pressure applied on the rolls may be adjusted according with the optimal conditions ranging from 15 to 100 kN/l·cm According to some embodiments, at step 110 the resulting flakes from step 108 may undergo soft crushing to provide more than 85% spherical fertilizer granules, preferably more than 85% spherical fertilizer granules, most preferably more than 95% spherical fertilizer granules.

According to some embodiments, at step 112, the material may be screened to separate the fine particles (less than 15% of the total yield, preferably less than 10% of the total yield and most preferably less than 5% of the total yield).

According to some embodiments the fine particles may be re-incorporated back to the system to be added to the mixture at step 106.

According to some embodiments, screening 112 may be done using any suitable screening device of filter to ensure the screen below and/or above a certain particle size, for example, granules over 2 millimeters (mm) will proceed to the final packaging and particles having a size less than 2 mm will be re-incorporated back into the process.

According to some demonstrative embodiments, step 114 optionally includes wetting and/or polishing of the resulting spherical fertilizer granules to provide for a post-treated granule.

According to some embodiments, it is to be understood that the wetting and polishing used in the process of the present invention is substantially diminished in comparison to the polishing required in processes known in the art.

Presently used processes result in the breakage of a granular sheet during the step of production. This results in raw granules having sharp edges and a non-uniform surface having bumps and indentations. These type of granules require considerable wetting and polishing to yield a smooth spherical granule.

In contrast, the present invention provides for a process which yields smooth spherical fertilizer granules directly at the end of the compaction.

According to some embodiments, the granules coming out of the compactor might have minor bumps at the area of connection of the two hemispheres. This area may be removed at step 114 via wetting and soft polishing.

According to some embodiments, the wetting (0.5% to 3%) may be done in a drum (residence time between 1 to 30 minutes), mixer, screw mixer, double screw mixer or fluid bed and/or by a spraying system.

According to some embodiments, the wetting materials which may be used during step 114 may include for example: water, basic and acid solutions in different concentration or brines, saturated or diluted solutions (for example water glass, ammonium sulfate, potash or other).

According to some embodiments, organic materials may be used to smooth the shape of the spherical fertilizer granule, decrease the environmental influence and/or prevent caking.

According to some embodiments, post treatment of the granules may also include the addition of soluble or insoluble chemicals acids or bases in concentrations between 0.01 to 5% and possible coatings of the granule with materials like oil, wax, anticaking agents and antidust, for example, in concentrations of 0.01 to 5%. According to some embodiments, micronutrients may be also added into the granules.

According to some embodiments, the post treated granule may optionally further be dried in a drum dryer or a fluid bed dryer in step 116, for example, at temperatures between 60 to 200 degrees Celsius.

According to some demonstrative embodiments, in step 118 the granules may optionally be coated with one or more coating.

For example, a coating material may be selected from a group including: brines, water, oils, waxes, polymers anticaking agent or combinations thereof.

According to some embodiments, coating the granule with one or more coatings may prevent dust formation, moisture absorption, caking and adhesion with other products, e.g., during bulk blending.

Reference is now made to FIG. 2 which is a schematic illustration of a surface of a compactor roll in accordance with some demonstrative embodiments of the present invention.

According to some embodiments the surface of the compactor roll may include a plurality of concaved hemispheres 202 which may be aligned with the surface of a second compactor roll, and upon compaction will create the shape of a sphere.

As shown in FIG. 2, the surface of the compactor roll may also include "dead spaces" 204 between concaved hemispheres 202.

According to some demonstrative embodiments, the existence of spaces 204 reduces the yield of the process.

According to some embodiments, the size of spaces 204 may be reduced if the diameter of concaved hemispheres 202 is reduced and more concaved hemispheres 202 may fit upon the surface of the compactor roll.

According to some embodiments, the size of spaces 204 may also be reduced if concaved hemispheres 202 having a plurality of diameters, as depicted for example in FIG. 3.

Reference is now made to FIG. 3 which is a schematic illustration of a surface of a compactor roll in accordance with some demonstrative embodiments of the present invention.

According to some embodiments the surface of the compactor roll may include a plurality of concaved hemispheres 302, 304 and 306 which may be aligned with the surface of a second compactor roll, and upon compaction will create the shape of a sphere.

According to some embodiments, the diameter of concaved hemispheres 302 is greater than the diameter of concaved hemispheres 304, which is greater than the diameter of concaved hemispheres 306.

Figure 4:
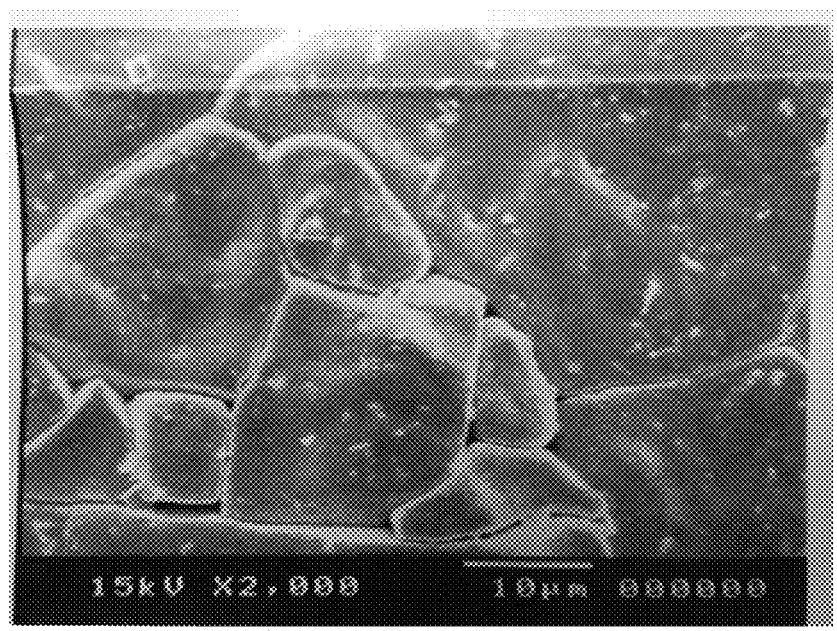
FIGS. 4A and 4B are photos from a scanning electron microscope demonstrating the malleability of potash, in accordance with some demonstrative embodiments.
Figure 4:
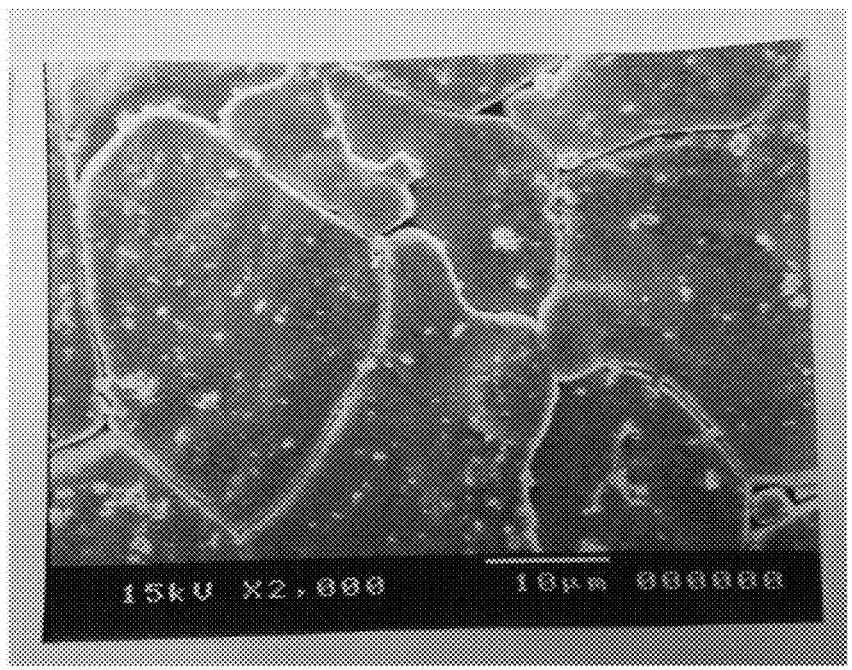

According to some embodiments, the use of concaved hemispheres 302, 304 and 306 having a variety of diameters provides for a higher yield (over 95%) and for a product with various granule sizes, which enables for a variety of dissolution rate within the final product as explained in detail hereinabove. Reference is now made to FIGS. 4A and 4B which are photos from a scanning electron microscope demonstrating the malleability of potash, in accordance with some demonstrative embodiments.

According to some embodiments, preferable fertilizers to be used in the process of the present invention include fertilizer which are K derivatives, and most preferably, Potash and Polysulphate.

According to some embodiments, potash and other K derivatives, such as polysulphate, demonstrate good malleability, and have high engagement with other materials having different characteristics.

FIGS. 4A and 4B demonstrate the high malleability of potash and the high adherence to other materials.

Example 1

Equipment:
Compactor Sahut Conrehur250/40.
Tires type: Pockets, pocket diameter 3 to 6 mm.
Mixer Hi share 200 L
Screener Boltom
Coating drum with spraying system
Fluid bed drier
Feed material:
Potash dust.
Particle size: less than 200 microns.
KCl content: 97%
Moisture <0.1%
No anticaking additives
Description:
The material was fed at ambient temp (20° C.) to 160° C.

The compactor was operated under special conditions to produce balls 3, 4, and 5 mm diameter and s.g. 1.90-1.99 gr/cm3.

The force feeder, tires velocity and gap between the tires were modified in order to produce the granules with minimum thickness connection between them.

The force feeder was removed and the material was fed directly into the compactor (gravitation), small flaps were installed in order to reduce the flowrate.

The initial gap between the roll was 0.3 mm. the rolls were synchronized in order to rich spherical balls.

The rolls speed of were between 5 and 40 RPM. The implemented pressure was 30-60 kN/lcm.

We reached a capacity of 103 kg/h at 3 to 15 rpm. The yield obtained was 93% (i.e. 7% of fines).

After granulation the material was post-treated in a drum to reduce the burrs.

To increase the quality of the product (smoothing) a process of wetting and drying was applied.

Results:
The balls dimensions obtained were: 6.3 mm×6.2 mm×3.8 mm (volume: 0.07 cm$^3$/granule).
Porosity (BET, ADS-DES N2) 0.04 cm$^3$ SMTP/g to 0.1%
Density: 1.94-1.99 g/cm$^3$
Bulk density: Loose: 850 to 1.200 kg/m3, tapped: 900-1200 kg/m$^3$ While this invention has been described in terms of some specific examples, many modifications and variations are possible. It is therefore understood that within the scope of the appended claims, the invention may be realized otherwise than as specifically described.

The invention claimed is:

1. A spherical fertilizer granule having a specific gravity of more than 1.94 g/cm$^3$ and less than 3% porosity.

2. The granule of claim 1, wherein said spherical fertilizer granule comprises a fertilizer selected from a group consisting of single nutrient ("straight") fertilizers, Ammonium nitrate, Urea, calcium ammonium nitrate, superphosphate, "Single superphosphate" (SSP), phosphogypsum, Triple superphosphate (TSP) or a mixture thereof; Multinutrient fertilizers, Binary (NP, NK, PK) fertilizers, monoammonium phosphate (MAP), diammonium phosphate (DAP), NPK fertilizers, fertilizers which include one or more of the main micronutrients sources of Iron, Manganese, Molybdenum, Zinc, Boron and Copper; Compound fertilizers, fertilizers which contain N, P, and K; Organic fertilizers, peat, animal wastes, plant wastes from agriculture, nitrogen fertilizers, ammonia, anhydrous ammonium nitrate, urea and sodium nitrate; Phosphate fertilizers; Potassium fertilizers, Potash, potassium chloride, potassium sulfate, potassium carbonate, potassium nitrate, and polysulphate.

3. The granule of claim 2, wherein said fertilizer is Potash.

4. The granule of claim 2, wherein said fertilizer is polysulphate.

5. The granule of claim 1, having a specific gravity of at least 1.96 g/cm$^2$.

6. The granule of claim 1, having a release rate of less than 5% over a 5 day period.

7. The granule of claim 1, having a release rate of less than 10% over a 10 day period.

8. A process for the production of spherical fertilizer granules comprising:
Mixing various particle sizes of a fertilizer dust, wherein more than 20% of the particles of said dust have a size of less than 150 μm;
Compacting said fertilizer dust at a temperature of 25-200 degrees Celsius in a one step compaction using compaction rolls having spherical shaped cavities; and
Soft crushing to provide more than 85% spherical granules having a smooth surface, homogeneous and uniform size.

9. The process of claim 8, wherein said process comprises soft crushing to provide more than 95% spherical fertilizer granules.

10. The process of claim 8, wherein said spherical granules have a specific gravity of more than 1.94 g/cm$^2$ and less than 3% porosity.

11. The process of claim 8, wherein said process further includes re-incorporating less than 15% of fine particles back into the process.

12. The process of claim 11, wherein said process further includes re-incorporating less than 5% of fine particles back into the process.

13. The process of claim 8, wherein said process further includes coating said granules with one or more coatings.

14. The process of claim 13, wherein said one or more coatings is selected from the group consisting of waxes, oils, stearic acid, citric acid, silica compound, polymers, anilines, ammonium sulfate, inorganic brine, petroleum compounds, amines, basic solutions, water, cements, dissolved salts, melted materials, hydrophobic compounds and s-combinations thereof.

* * * * *